(12) United States Patent
Huang

(10) Patent No.: US 11,019,460 B2
(45) Date of Patent: May 25, 2021

(54) SMART MULTIMEDIA TRANSMISSION SYSTEM AND METHOD

(71) Applicant: PopWorld Inc., Taipei (TW)

(72) Inventor: Sheng-Hung Huang, New Taipei (TW)

(73) Assignee: Popworld Inc., Taipei (TW)

( * ) Notice: Subject to any disclaimer, the term of this patent is extended or adjusted under 35 U.S.C. 154(b) by 0 days.

(21) Appl. No.: 17/028,476

(22) Filed: Sep. 22, 2020

(65) Prior Publication Data

US 2021/0006942 A1 Jan. 7, 2021

Related U.S. Application Data

(62) Division of application No. 16/704,539, filed on Dec. 5, 2019, now Pat. No. 10,848,922.

(30) Foreign Application Priority Data

Dec. 5, 2018 (TW) .................................. 107143701

(51) Int. Cl.
*H04W 4/02* (2018.01)
*H04W 4/029* (2018.01)
*H04W 4/021* (2018.01)
*H04B 17/27* (2015.01)
*H04B 17/318* (2015.01)

(52) U.S. Cl.
CPC ............ *H04W 4/029* (2018.02); *H04B 17/27* (2015.01); *H04B 17/318* (2015.01); *H04W 4/021* (2013.01)

(58) Field of Classification Search
CPC ........ H04W 4/021; H04W 4/029; H04W 4/33
See application file for complete search history.

(56) References Cited

U.S. PATENT DOCUMENTS

| 7,231,454 | B2 | 6/2007 | Togashi |
| 2015/0140988 | A1 | 5/2015 | Kim et al. |
| 2015/0180534 | A1* | 6/2015 | Lacatus ................... G01S 19/16 375/133 |
| 2020/0021772 | A1 | 1/2020 | Xiong et al. |

* cited by examiner

*Primary Examiner* — Michael T Vu
(74) *Attorney, Agent, or Firm* — Muncy, Geissler, Olds & Lowe, P.C.

(57) ABSTRACT

A smart multimedia transmission system includes a plurality of beacon signal transmitting apparatuses and a server. The smart multimedia transmission system enables a mobile data processing apparatus to quickly determine a selected beacon signal transmitting apparatus from the plurality of beacon signal transmitting apparatuses. The server transmits the multimedia data corresponding to the selected beacon signal transmitting apparatus to the mobile data processing apparatus.

4 Claims, 7 Drawing Sheets

SMART MULTIMEDIA TRANSMISSION SYSTEM AND METHOD

CROSS-REFERENCE TO RELATED APPLICATION PROGRAM

This application is a Divisional application of U.S. patent application Ser. No. 16/704,539, filed on Dec. 5, 2019, which claims priority to Taiwan Application program serial no. 107143701, filed Dec. 5, 2018, which are incorporated herein by reference.

BACKGROUND OF THE INVENTION

1. Field of the Invention

The invention relates to a multimedia transmission system and method, and more in particular, to a smart multimedia transmission system and method which enable a mobile data processing apparatus to quickly determine a selected beacon signal transmitting apparatus and transmit multimedia data corresponding to the selected beacon signal transmitting apparatus to the mobile data processing apparatus.

2. Description of the Prior Art

In recent years, in specific areas, such as exhibition venues, shopping malls, museums, playgrounds, campuses, etc., location-based services using beacon signals have emerged for users of mobile data processing apparatuses.

However, in these specific areas, due to crowded beacon signal transmitting apparatuses, or due to on-site environmental factors, it is often difficult for the user's mobile data processing apparatus to quickly determine the selected beacon signal transmitting apparatus from numerous beacon signal transmitting apparatuses. Even a wrong beacon signal sending apparatus is often determined as the selected beacon signal transmitting apparatus from numerous beacon signal transmitting apparatuses. It also makes users feel bad about location-based services in these specific areas.

In addition, because mobile data processing apparatuses of different brands or different types of mobile data processing apparatuses of the same brand may have different sensitivity in receiving signals, it results in different numbers of beacon signals received by different brands and different types of mobile data processing apparatuses at the same position. At present, there is no multimedia transmission system and method which can intelligently adjust the reception threshold of the mobile data processing apparatus to receive the beacon signal, so that the mobile data processing apparatus can quickly determine the selected beacon signal transmitting apparatus.

SUMMARY OF THE INVENTION

Accordingly, one scope of the invention is to provide a smart multimedia transmission system and method which enable a mobile data processing apparatus of a user to quickly determine a selected beacon signal transmitting apparatus, and then a server transmits the multimedia data corresponding to the selected beacon signal transmitting apparatus to the mobile data processing apparatus.

According to the first preferred embodiment of the invention, a smart multimedia transmission system includes a plurality of beacon signal transmitting apparatuses and a server. The plurality of beacon signal transmitting apparatuses are installed in a specific area. The server includes a data storage unit, a communication unit and at least one processor. The data storage unit therein stores a plurality multimedia data which each corresponds to one of the plurality of beacon signal transmitting apparatuses. The at least one processor is respectively coupled to the data storage unit and the communication unit. A first mobile data processing apparatus is capable of communicating with the server through a network. A first application program is stored in the first mobile data processing apparatus. A reception threshold is previously stored in the first application program. The first mobile data processing apparatus is carried to a first position in the specific area, and executes the first application program, according to the reception threshold, to receive N first beacon signals sent by N first candidate beacon signal transmitting apparatuses of the plurality of beacon signal transmitting apparatuses adjacent to the first position, where N is a variable integer equal to or larger than 0. If N is equal to 0, the first mobile data processing apparatus repeatedly updates the reception threshold by subtracting a predetermined deduction from the reception threshold and receives the N first beacon signals sent by the N first candidate beacon signal transmitting apparatuses adjacent to the first position in accordance with the updated reception threshold until N is equal to 1. If N is larger than 1, the first mobile data processing apparatus repeatedly updates the reception threshold by adding a predetermined addition to the reception threshold and receives the N first beacon signals sent by the N first candidate beacon signal transmitting apparatuses adjacent to the first position in accordance with the updated reception threshold until N is equal to 1. Finally, the first candidate beacon signal transmitting apparatus is a first selected beacon signal transmitting apparatus. The first mobile data processing apparatus forwards a selected beacon signal sent by the first selected beacon signal transmitting apparatus to the at least one processor through the network and the communication unit. The selected beacon signal includes an apparatus identification code relative to the first selected beacon signal transmitting apparatus. The at least one processor determines the first selected beacon signal transmitting apparatus from the N first candidate beacon signal transmitting apparatuses in accordance with the apparatus identification code, retrieves the multimedia data corresponding to the first selected beacon signal transmitting apparatus from the data storage unit, and transmits the retrieved multimedia data to the first mobile data processing apparatus through the communication unit and the network.

In one embodiment, the first mobile data processing apparatus replaces the reception threshold previously stored in the first application program by the updated reception threshold when the first selected beacon signal transmitting apparatus is determined.

In the smart multimedia transmission system according to the first preferred embodiment of the invention, the data storage unit therein also stores a plurality of sampled vicinity signal strength distribution maps which each corresponds to one of the plurality of beacon signal transmitting apparatuses. A second mobile data processing apparatus is capable of communicating with the server through the network. A second application program is stored in the second mobile data processing apparatus. The second mobile data processing apparatus is carried to a second position in the specific area, and executes the second application program to receive M second beacon signals sent by M second candidate beacon signal transmitting apparatuses of the plurality of beacon signal transmitting apparatuses adjacent to the second position, and to generate a current vicinity signal strength distribution map, where M is an integer larger than 1. The second mobile data processing apparatus transmits the current vicinity signal strength distribution map to the at least one processor through the network and the communication unit. The at least one processor compares the current vicinity signal strength distribution map with the plurality of sampled vicinity signal strength distribution maps to determine a second selected beacon signal transmitting apparatus from the M second candidate beacon signal transmitting apparatuses, retrieves the multimedia data corresponding to the second selected beacon signal transmitting apparatus from the data storage unit, and transmits the retrieved multimedia data to the second mobile data processing apparatus through the communication unit and the network.

In one embodiment, each beacon signal transmitting apparatus can broadcast the respective beacon signal in a wireless communication protocol. The wireless communication protocol can be a Bluetooth protocol, a Wi-Fi protocol, an LTE protocol, IEEE 802.11-based protocols, a Zigbee protocol, a Z-wave protocol or other wireless communication protocols.

According to the third preferred embodiment of the invention, a smart multimedia transmission method is firstly to execute, by a first mobile data processing apparatus, a first application program stored in the first mobile data processing apparatus, where a reception threshold is previously stored in the first application program, the first mobile data processing apparatus is carried to a first position in the specific area. Next, the smart multimedia transmission method of the invention is to execute, by the first mobile data processing apparatus, the first application program, according to the reception threshold, to receive N first beacon signals sent by N first candidate beacon signal transmitting apparatuses of a plurality of beacon signal transmitting apparatuses adjacent to the first position, where N is a variable integer equal to or larger than 0, the plurality of beacon signal transmitting apparatuses are installed in the specific area. Then, if N is larger than 1, the smart multimedia transmission method of the invention is to repeatedly update, by the first mobile data processing apparatus, the reception threshold by adding a predetermined addition to the reception threshold, and to receive the N first beacon signals sent by the N first candidate beacon signal transmitting apparatuses adjacent to the first position in accordance with the updated reception threshold until N is equal to 1. Subsequently, if N is equal to 0, the smart multimedia transmission method of the invention is to repeatedly update, by the first mobile data processing apparatus, the reception threshold by subtracting a predetermined deduction from the reception threshold, and to receive the N first beacon signals sent by the N first candidate beacon signal transmitting apparatuses adjacent to the first position in accordance with the updated reception threshold until N is equal to 1, where finally, the first candidate beacon signal transmitting apparatus is a first selected beacon signal transmitting apparatus. Afterwards, the smart multimedia transmission method of the invention is to forward, by the first mobile data processing apparatus, a selected beacon signal sent by the first selected beacon signal transmitting apparatus to a server through a network and the communication unit, where the selected beacon signal includes an apparatus identification code relative to the first selected beacon signal transmitting apparatus, the server therein stores a plurality of multimedia data which each corresponds to one of the plurality of beacon signal transmitting apparatuses. Finally, the smart multimedia transmission method of the invention is to determine, by the server, the first selected beacon signal transmitting apparatus from the N first candidate beacon signal transmitting apparatuses in accordance with the apparatus identification code, to retrieve the multimedia data corresponding to the first selected beacon signal transmitting apparatus, and to transmit the retrieved multimedia data to the first mobile data processing apparatus through the network.

Distinguishable from the prior art, the smart multimedia transmission system and method according to the invention enable a mobile data processing apparatus of a user to quickly determine a selected beacon signal transmitting apparatus, and then a server transmits the multimedia data corresponding to the selected beacon signal transmitting apparatus to the mobile data processing apparatus.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
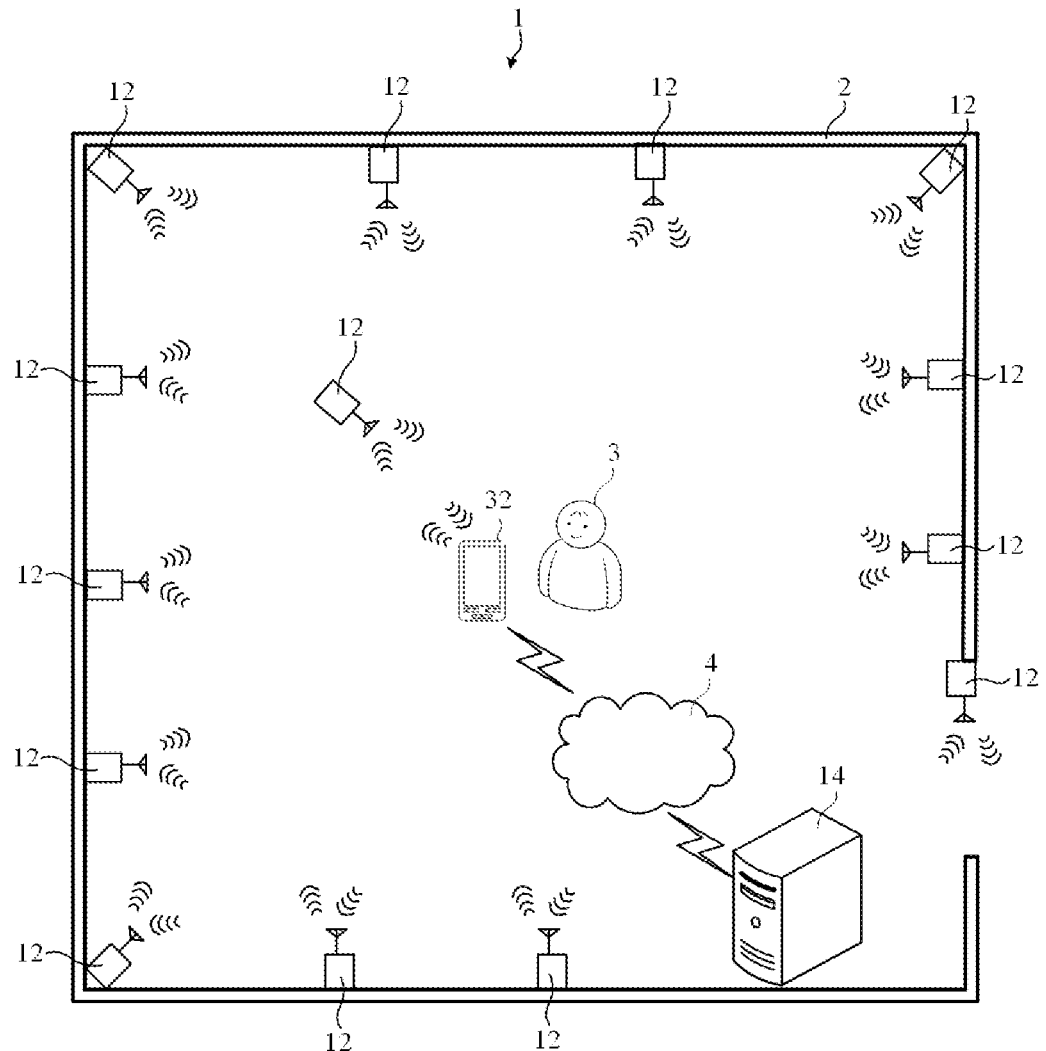
FIG. 1 is a schematic diagram showing the architecture of a smart multimedia transmission system according to the first preferred embodiment of the invention.
Figure 2:
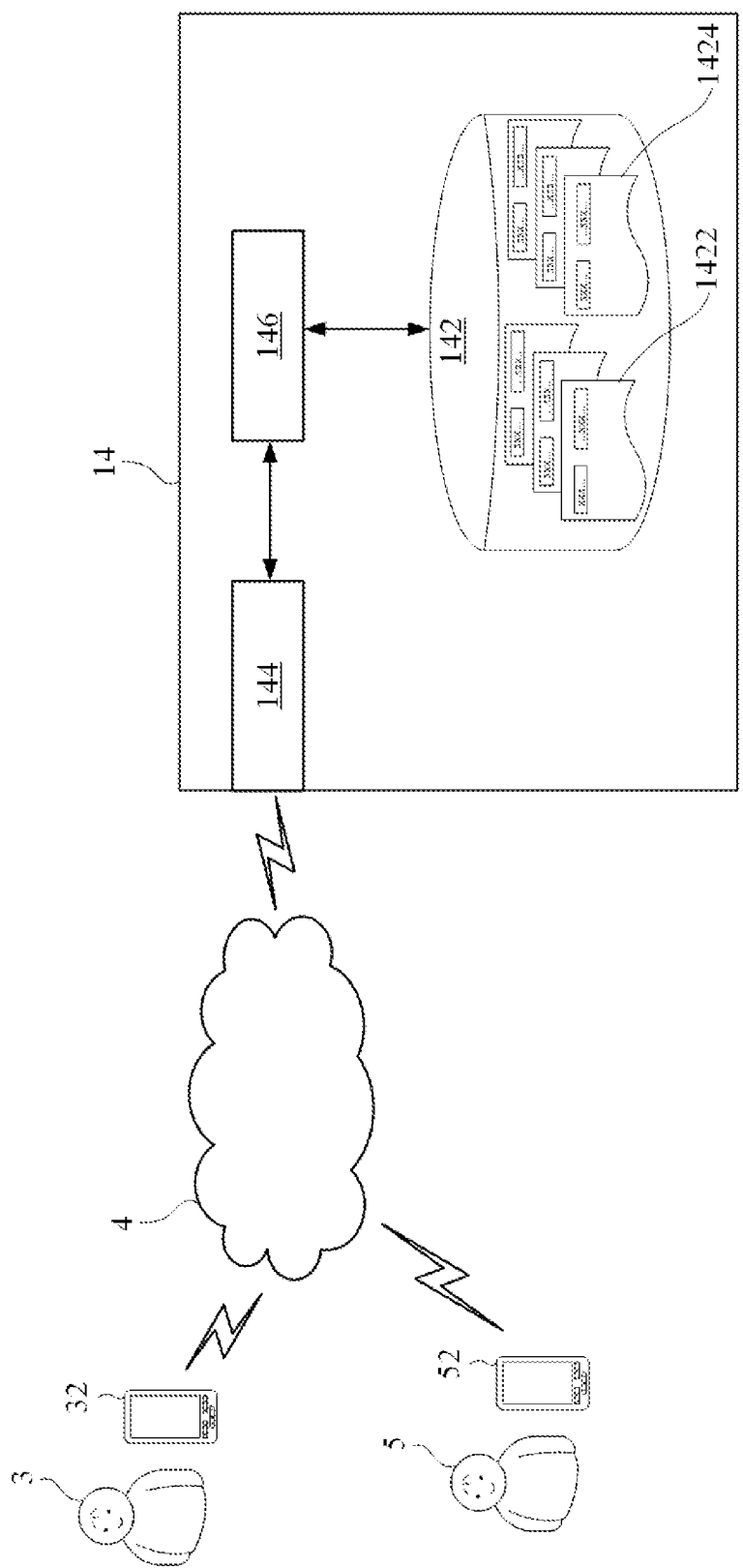
FIG. 2 is a functional block diagram of a server as an essential component of the smart multimedia transmission system according to the first preferred embodiment of the invention.

Referring to FIG. 1 an FIG. 2, FIG. 1 is a schematic diagram showing the architecture of the smart multimedia transmission system 1 according to the first preferred embodiment of the invention. FIG. 2 is a functional block diagram of a server 14 as an essential component of the smart multimedia transmission system 1 according to the first preferred embodiment of the invention.

As shown in FIG. 1, the smart multimedia transmission system 1, according to a first preferred embodiment of the invention, includes a plurality of beacon signal transmitting apparatuses 12 and a server 14. The plurality of beacon signal transmitting apparatuses 12 are installed in a specific area 2. For example, the specific area 2 shown in FIG. 1 is an exhibition venue. In practical application programs, the specific area 2 may be a closed area or an open area, such as an exhibition venue, a shopping mall, a museum, a playground, a campus, or the like.

In one embodiment, each beacon signal transmitting apparatus 12 can broadcast the respective beacon signal in a wireless communication protocol. The wireless communication protocol can be a Bluetooth protocol, a Wi-Fi protocol, an LTE protocol, IEEE 802.11-based protocols, a Zigbee protocol, a Z-wave protocol or other wireless communication protocols.

As shown in FIG. 2, the server 14 includes a data storage unit 142, a communication unit 144 and at least one processor 146. The data storage unit 142 therein stores a plurality multimedia data 1422 which each corresponds to one of the plurality of beacon signal transmitting apparatuses 12. The at least one processor 146 is respectively coupled to the data storage unit 142 and the communication unit 144.

A first mobile data processing apparatus 32 is capable of communicating with the server 14 through a network 4. A first application program is stored in the first mobile data processing apparatus 32. A reception threshold is previously stored in the first application program. The first mobile data processing apparatus 32 is carried by a user 3 to a first position in the specific area 2. The first mobile data processing apparatus 32 executes the first application program to obtain a location-based service.

In practical application program, the first mobile data processing apparatus 32 can be a notebook computer, a tablet computer, a mobile phone, or other mobile data processing apparatus.

In one embodiment, the first application program can be executed on a mobile communication platform of the first mobile data processing apparatus 32. For example, the first application program can be an App running on the mobile communication platform such as iOS, Android, or Windows.

In one embodiment, the network 4 can be can be a radio telecommunication network, a 3G network, a 4G network, a 5G network, an HSPA network, a Wi-Fi network, a WiMAX network, an LTE network, or other popular commercial network.

The first mobile data processing apparatus 32 executes the first application program, according to the reception threshold, to receive N first beacon signals sent by N first candidate beacon signal transmitting apparatuses 12 of the plurality of beacon signal transmitting apparatuses 12 adjacent to the first position, where N is a variable integer equal to or larger than 0.

If N is equal to 0, the first mobile data processing apparatus 32 repeatedly updates the reception threshold by subtracting a predetermined deduction from the reception threshold, receives the N first beacon signals sent by the N first candidate beacon signal transmitting apparatuses 12 adjacent to the first position in accordance with the updated reception threshold until N is equal to 1, and finally, the first candidate beacon signal transmitting apparatus 12 is a first selected beacon signal transmitting apparatus 12. In practical application, if the strength of the beacon signals (for example, the received signal strength indication, RSSI) received by the first mobile data processing apparatus 32 and sent by the beacon signal transmitting apparatuses 12 near the first position is equal to or higher than the reception threshold (for example, −70 dBm), these beacon signal transmitting apparatuses 12 are all listed as candidate beacon signal transmitting apparatuses 12. The predetermined deduction may be, for example, 5 dBm.

If N is larger than 1, the first mobile data processing apparatus 32 repeatedly updates the reception threshold by adding a predetermined addition to the reception threshold, receives the N first beacon signals sent by the N first candidate beacon signal transmitting apparatuses 12 adjacent to the first position in accordance with the updated reception threshold until N is equal to 1, and finally, the first candidate beacon signal transmitting apparatus 12 is a first selected beacon signal transmitting apparatus 12. In practical application, if the strength of the beacon signals (for example, the received signal strength indication, RSSI) received by the first mobile data processing apparatus 32 and sent by the beacon signal transmitting apparatuses 12 near the first position is equal to or lower than the reception threshold (for example, −80 dBm), these beacon signal transmitting apparatuses 12 are all listed as candidate beacon signal transmitting apparatuses 12. The predetermined addition may be, for example, 5 dBm.

The first mobile data processing apparatus 32 forwards a selected beacon signal sent by the first selected beacon signal transmitting apparatus 12 to the at least one processor 146 through the network 4 and the communication unit 144. The selected beacon signal includes an apparatus identification code relative to the first selected beacon signal transmitting apparatus 12, such as media access control address. The at least one processor 146 determines the first selected beacon signal transmitting apparatus 12 from the N first candidate beacon signal transmitting apparatuses 12 in accordance with the apparatus identification code, retrieves the multimedia data 1422 corresponding to the first selected beacon signal transmitting apparatus 12 from the data storage unit 142, and transmits the retrieved multimedia data 1422 to the first mobile data processing apparatus 32 through the communication unit 144 and the network 4. The first mobile data processing apparatus 32 plays back the received multimedia data 1422.

Thereby, the smart multimedia transmission system 1 according to the invention enable the first mobile data processing apparatus 32 of the user 3 to smartly and quickly determine the selected beacon signal transmitting apparatus 12 from the plurality of beacon signal transmitting apparatuses 12.

In one embodiment, the first mobile data processing apparatus 32 replaces the reception threshold previously stored in the first application program by the updated reception threshold when the first selected beacon signal transmitting apparatus 12 is determined.

Figure 3:
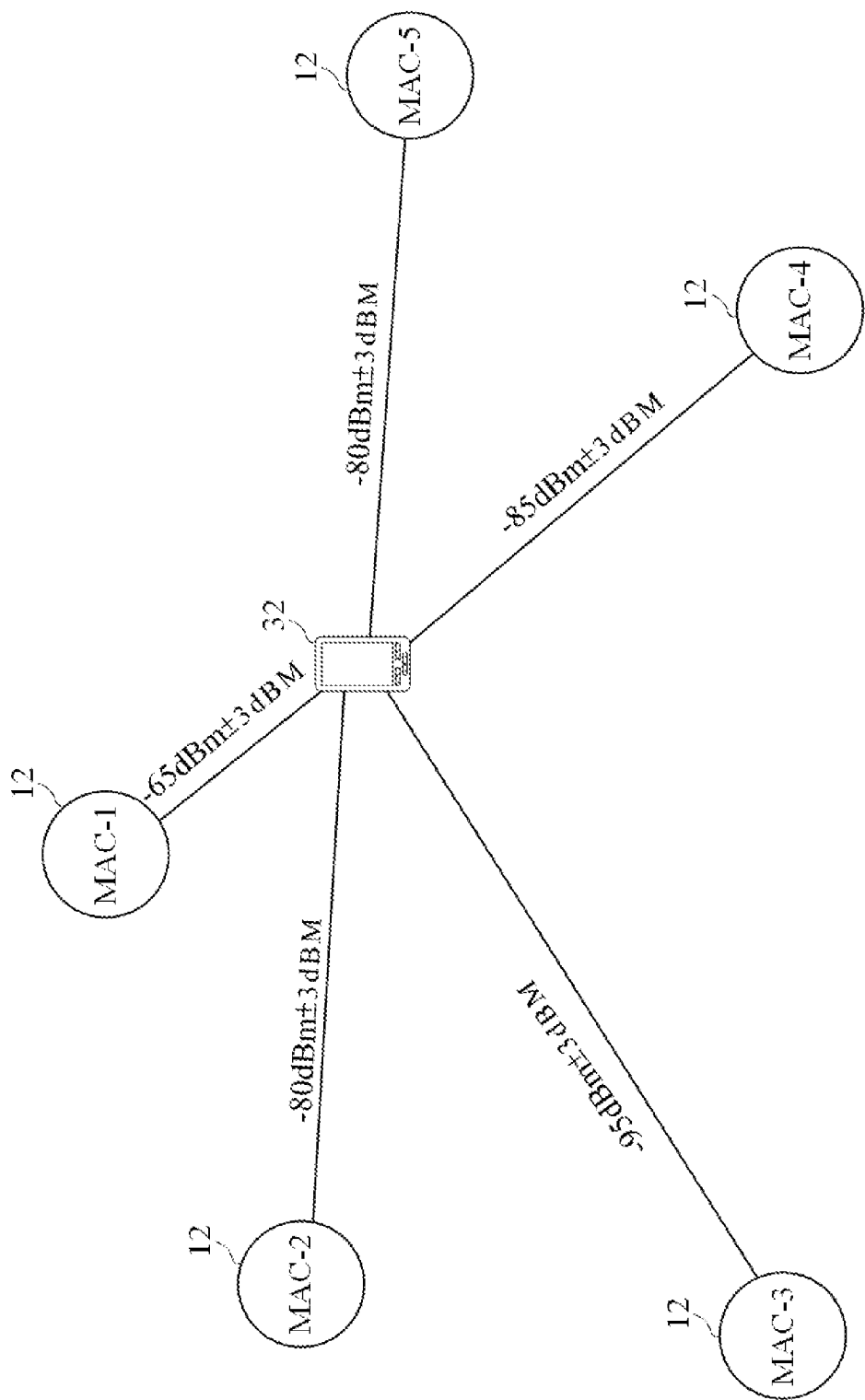
FIG. 3 is a schematic diagram of an example of the strength distribution of nearby signals.

Also as shown in FIG. 2, in the smart multimedia transmission system 1 according to the first preferred embodiment of the invention, the data storage unit 142 therein also stores a plurality of sampled vicinity signal strength distribution maps 1424 which each corresponds to one of the plurality of beacon signal transmitting apparatuses 12. The plurality of sampled vicinity signal strength distribution maps 1424 can be analyzed to be obtained by the received N beacon signals (at this time N is greater than 1) before the selected beacon signal transmitting apparatuses 12 is determined, the selected beacon signal transmitting apparatuses 12 been determined and son on, as the data processing apparatus 32 previously moves to different positions. An example of the sampled vicinity signal strength distribution map 1424 is schematically shown in FIG. 3. As shown in FIG. 3, at the position where the selected beacon signal transmitting apparatus 12 is labelled as "MAC-1", the mobile data processing apparatus 32 receives the beacon signals sent by five beacon signal transmitting apparatuses 12 labelled as "MAC-1", "MAC-2", "MAC-3", "MAC-4", and "MAC-5". The sampled vicinity signal strength distribution map 1424 shown in FIG. 3 indicates that the mobile data processing apparatus 32 receives the strength of the five beacon signals.

A second mobile data processing apparatus 52 is capable of communicating with the server 14 through the network 4. A second application program is stored in the second mobile data processing apparatus 52. The second mobile data processing apparatus 52 is carried by another user 5 to a second position in the specific area 2. The second mobile data processing apparatus 52 executes the second application program to obtain a location-based service.

In one embodiment, the second application program can be executed on a mobile communication platform of the second mobile data processing apparatus 52. For example, the second application program can be an App running on the mobile communication platform such as iOS, Android, or Windows.

The second mobile data processing apparatus 52 executes the second application program to receive M second beacon signals sent by M second candidate beacon signal transmitting apparatuses 12 of the plurality of beacon signal transmitting apparatuses 12 adjacent to the second position, and to generate a current vicinity signal strength distribution map 1424, where M is an integer larger than 1. The second mobile data processing apparatus 52 transmits the current vicinity signal strength distribution map 1424 to the at least one processor 146 through the network 4 and the communication unit 144. The at least one processor 146 compares the current vicinity signal strength distribution map 1424 with the plurality of sampled vicinity signal strength distribution maps 1424 to determine a second selected beacon signal transmitting apparatus 12 from the M second candidate beacon signal transmitting apparatuses 12. When the at least one processor 146 performs the comparison, a deviation value regarding the beacon signal strength can also be considered, as shown in FIG. 3.

The at least one processor 146 retrieves the multimedia data 1422 corresponding to the second selected beacon signal transmitting apparatus 12 from the data storage unit 142, and transmits the retrieved multimedia data 1422 to the second mobile data processing apparatus 52 through the communication unit 144 and the network 4. The second mobile data processing apparatus 52 plays back the received multimedia data 1422.

Referring to FIG. 1 an FIG. 2 again, the architecture of the smart multimedia transmission system 1 according to the second preferred embodiment of the invention is the same as that shown in FIG. 1. The functional block diagram of the server 14 as an essential component of the smart multimedia transmission system 1 according to the second preferred embodiment of the invention is the same as the functional block diagram shown in FIG. 2.

Distinguishable from the first preferred embodiment, in the second smart multimedia transmission system 1 according to the second preferred embodiment of the invention, the first mobile data processing apparatus 32 executes the first application program to transmit a first request information to the at least one processor 146 through the network 4 and the communication unit 144. The at least one processor 146 transmits the plurality of multimedia data 1422 stored in the data storage unit 142 to the first mobile data processing apparatus 32 in response to the first request information through the communication unit 144 and the network 4.

The first mobile data processing apparatus 32 executes the first application program, according to the reception threshold, to receive N first beacon signals sent by N first candidate beacon signal transmitting apparatuses 12 of the plurality of beacon signal transmitting apparatuses 12 adjacent to the first position, where N is a variable integer equal to or larger than 0.

If N is equal to 0, the first mobile data processing apparatus 32 repeatedly updates the reception threshold by subtracting a predetermined deduction from the reception threshold, receives the N first beacon signals sent by the N first candidate beacon signal transmitting apparatuses 12 adjacent to the first position in accordance with the updated reception threshold until N is equal to 1, and finally, the first candidate beacon signal transmitting apparatus 12 is a first selected beacon signal transmitting apparatus 12.

If N is larger than 1, the first mobile data processing apparatus 32 repeatedly updates the reception threshold by adding a predetermined addition to the reception threshold, receives the N first beacon signals sent by the N first candidate beacon signal transmitting apparatuses 12 adjacent to the first position in accordance with the updated reception threshold until N is equal to 1, and finally, the first candidate beacon signal transmitting apparatus 12 is a first selected beacon signal transmitting apparatus 12.

The first mobile data processing apparatus 32 retrieves the multimedia data 1422 corresponding to the first selected beacon signal transmitting apparatus 12. The first mobile data processing apparatus 32 plays back the retrieved multimedia data 1422.

In one embodiment, the first mobile data processing apparatus 32 replaces the reception threshold previously stored in the first application program by the updated reception threshold when the first selected beacon signal transmitting apparatus 12 is determined.

Further, the data storage unit 142 therein also stores a plurality of sampled vicinity signal strength distribution maps 1424 which each corresponds to one of the plurality of beacon signal transmitting apparatuses 12. A second mobile data processing apparatus 52 is capable of communicating with the server 14 through the network 4. A second application program is stored in the second mobile data processing apparatus 52. The second mobile data processing apparatus 52 is carried by another user 5 to a second position in the specific area 2. The second mobile data processing apparatus 52 executes the second application program to transmit a second request information to the at least one processor 146 through the network 4 and the communication unit 144. The at least one processor 146 transmits the multimedia data 1422 and the sampled vicinity signal strength distribution maps 1424 stored in the data storage unit 142 to the second mobile data processing apparatus 52 in response to the second request information through the communication unit 144 and the network 4.

The second mobile data processing apparatus 52 executes the second application program to receive M second beacon signals sent by M second candidate beacon signal transmitting apparatuses 12 of the plurality of beacon signal transmitting apparatuses 12 adjacent to the second position, and to generate a current vicinity signal strength distribution map 1424, where M is an integer larger than 1.

The second mobile data processing apparatus 52 compares the current vicinity signal strength distribution map 1424 with the plurality of sampled vicinity signal strength distribution maps 1424 to determine a second selected beacon signal transmitting apparatus 12 from the M second candidate beacon signal transmitting apparatuses 12. The second mobile data processing apparatus 52 retrieves the multimedia data 1422 corresponding to the second selected beacon signal transmitting apparatus 12. The second mobile data processing apparatus 52 plays back the retrieved multimedia data 1422.

Figure 4:
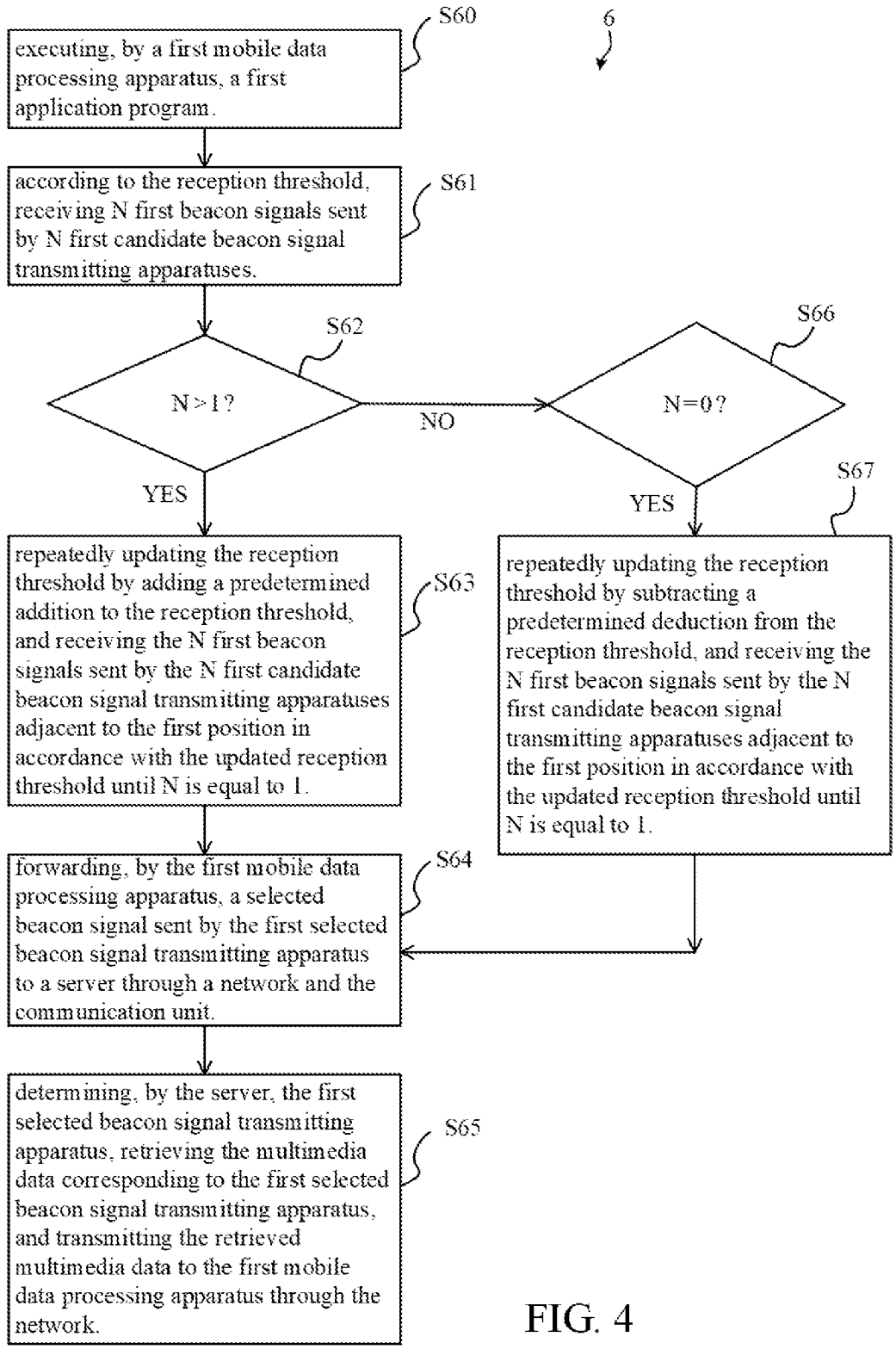
FIG. 4 is a flowchart diagram illustrating a smart multimedia transmission method according to the third preferred embodiment of the invention.

Referring to FIG. 4, FIG. 4 is a flowchart diagram illustrating the smart multimedia transmission method 6 according to the third preferred embodiment of the invention. The environment and architecture for implementing the smart multimedia transmission method 6 according to the invention are shown in FIG. 1 and FIG. 2.

As shown in FIG. 4, the smart multimedia transmission method 6 according to the invention, firstly, performs step S60 to execute, by a first mobile data processing apparatus 32, a first application program stored in the first mobile data processing apparatus 32, where a reception threshold is previously stored in the first application program. The first mobile data processing apparatus 32 is carried to a first position in the specific area 2.

Next, the smart multimedia transmission method 6 according to the invention performs step S61 to execute, by the first mobile data processing apparatus 32, the first application program, according to the reception threshold, to receive N first beacon signals sent by N first candidate beacon signal transmitting apparatuses 12 of a plurality of beacon signal transmitting apparatuses 12 adjacent to the first position, where N is a variable integer equal to or larger than 0. The plurality of beacon signal transmitting apparatuses 12 are installed in the specific area 2.

Then, the smart multimedia transmission method 6 according to the invention performs step S62 to judge if N is larger than 1.

If the judging result of step S62 is YES, the smart multimedia transmission method 6 according to the invention performs step S63 to repeatedly update, by the first mobile data processing apparatus 32, the reception threshold by adding a predetermined addition to the reception threshold, and to receive the N first beacon signals sent by the N first candidate beacon signal transmitting apparatuses 12 adjacent to the first position in accordance with the updated reception threshold until N is equal to 1, where finally, the first candidate beacon signal transmitting apparatus 12 is a first selected beacon signal transmitting apparatus 12.

After step S63, subsequently, the smart multimedia transmission method 6 according to the invention performs step S64 to forward, by the first mobile data processing apparatus 32, a selected beacon signal sent by the first selected beacon signal transmitting apparatus 12 to a server 14 through a network 4 and the communication unit 144, where the selected beacon signal includes an apparatus identification code relative to the first selected beacon signal transmitting apparatus 12, the server 14 therein stores a plurality of multimedia data 1422 which each corresponds to one of the plurality of beacon signal transmitting apparatuses 12.

After step S64, finally, the smart multimedia transmission method 6 according to the invention performs step S65 to determine, by the server 14, the first selected beacon signal transmitting apparatus 12 from the N first candidate beacon signal transmitting apparatuses 12 in accordance with the apparatus identification code, to retrieve the multimedia data 1422 corresponding to the first selected beacon signal transmitting apparatus 12, and to transmit the retrieved multimedia data 1422 to the first mobile data processing apparatus 32 through the network 4. The first mobile data processing apparatus 32 plays back the received multimedia data 1422.

Further, if the judging result of step S62 is NO, the smart multimedia transmission method 6 according to the invention performs step S66 to judge if N is equal to 0.

If the judging result of step S66 is YES, the smart multimedia transmission method 6 according to the invention performs step S67 to repeatedly update, by the first mobile data processing apparatus 32, the reception threshold by subtracting a predetermined deduction from the reception threshold, and to receive the N first beacon signals sent by the N first candidate beacon signal transmitting apparatuses 12 adjacent to the first position in accordance with the updated reception threshold until N is equal to 1, where finally, the first candidate beacon signal transmitting apparatus 12 is a first selected beacon signal transmitting apparatus 12. After step S67, the smart multimedia transmission method 6 according to the invention performs step S64. If N is equal to 1, the smart multimedia transmission method 6 according to the invention performs step S64.

Further, the smart multimedia transmission method 6 according to the invention is to replace, by the first mobile data processing apparatus 32, the reception threshold previously stored in the first application program by the updated reception threshold when the first selected beacon signal transmitting apparatus 12 is determined.

Figure 5:
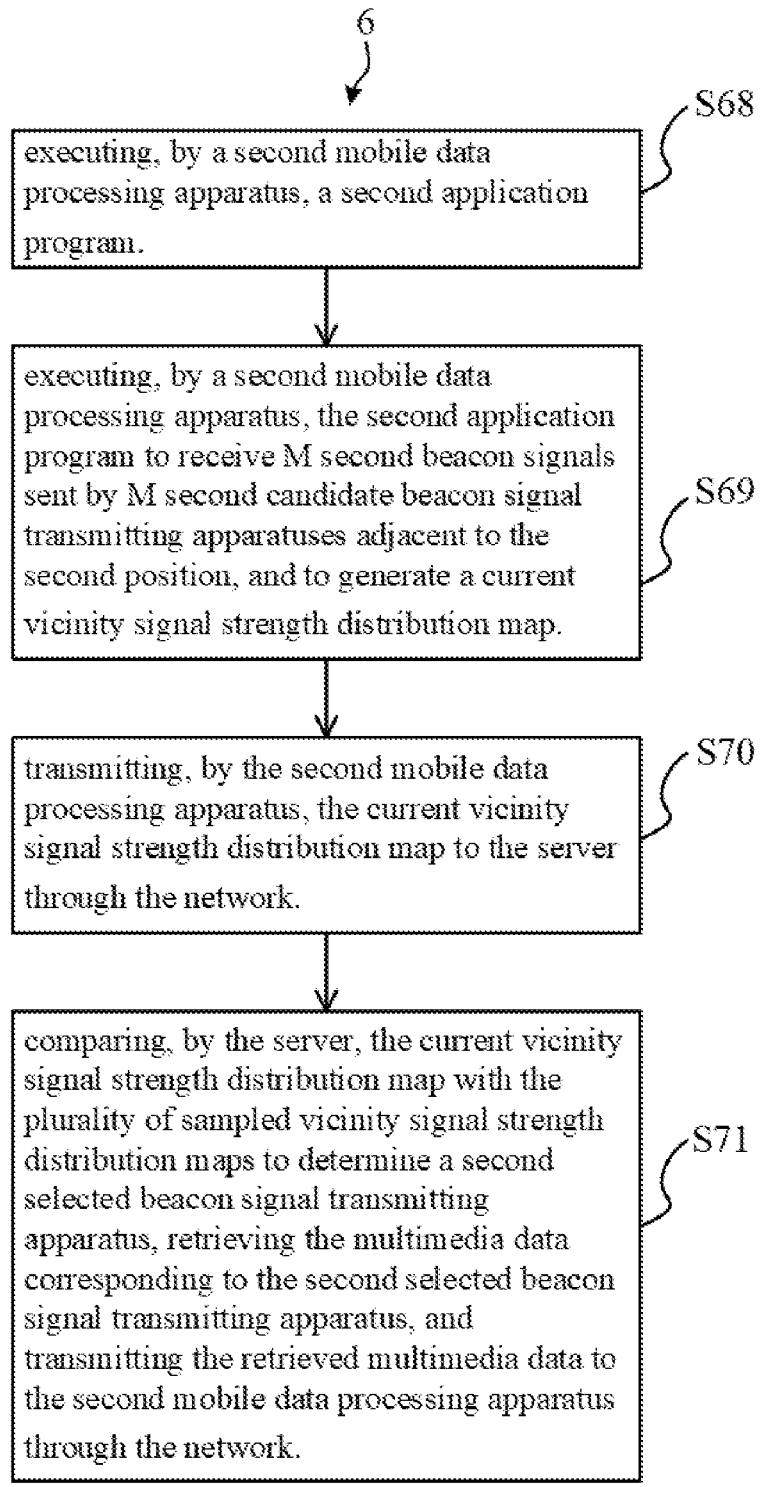
FIG. 5 is a flowchart diagram of further steps of the smart multimedia transmission method according to the third preferred embodiment of the invention.

Referring to FIG. 5, FIG. 5 is a flowchart diagram of further steps of the smart multimedia transmission method 6 according to the third preferred embodiment of the invention.

Figure 6:
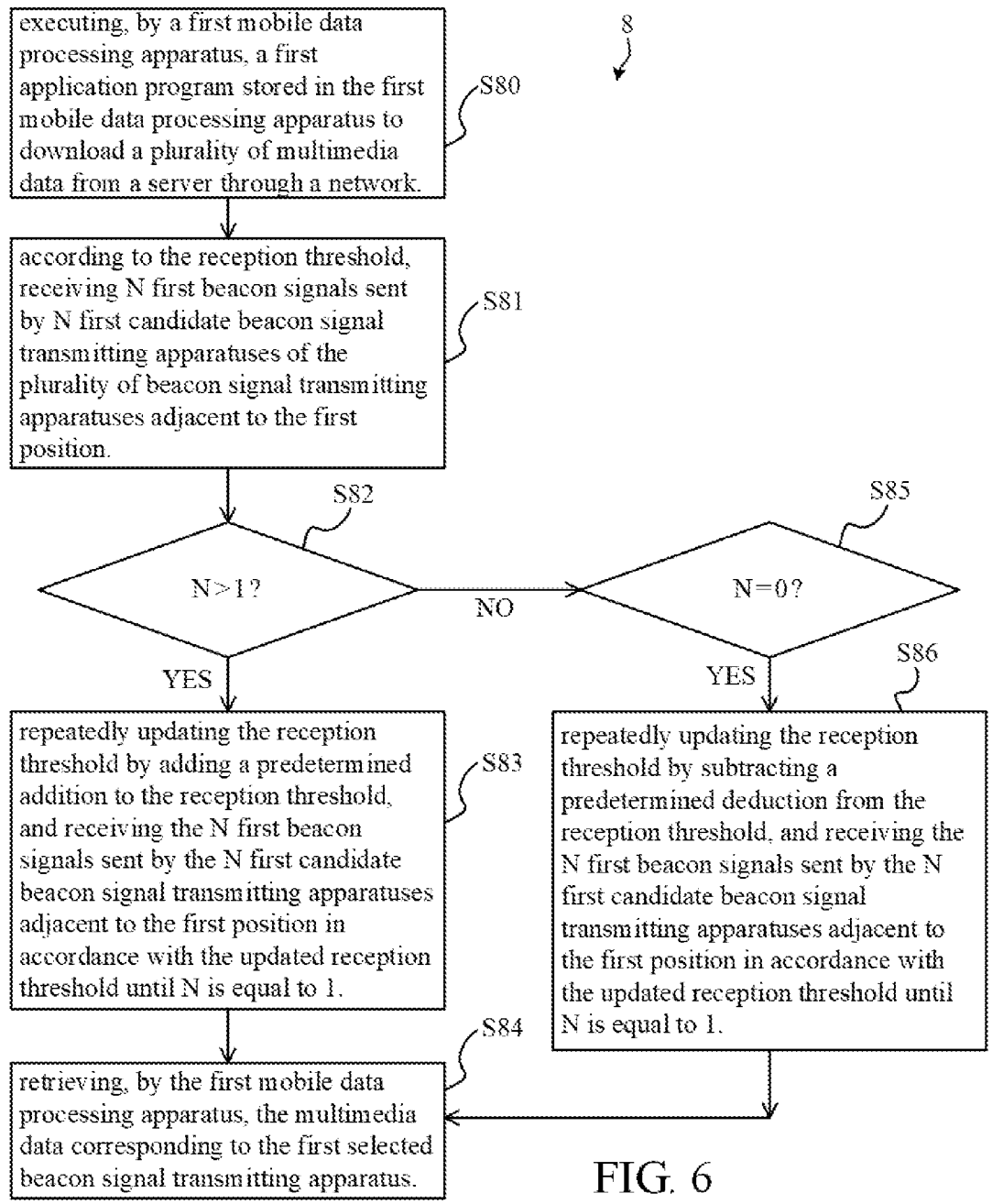
FIG. 6 is a flowchart diagram illustrating a smart multimedia transmission method according to the fourth preferred embodiment of the invention.

Further, the server 14 therein also stores a plurality of sampled vicinity signal strength distribution maps 1424 which each corresponds to one of the plurality of beacon signal transmitting apparatuses 12. As shown in FIG. 6, the smart multimedia transmission method 6 according to the invention also performs step S68 to execute, by a second mobile data processing apparatus 52, a second application program, where the second mobile data processing apparatus 52 is carried to a second position in the specific area 2.

Then, the smart multimedia transmission method 6 according to the invention also performs step S69 to execute, by a second mobile data processing apparatus 52, the second application program to receive M second beacon signals sent by M second candidate beacon signal transmitting apparatuses 12 of the plurality of beacon signal transmitting apparatuses 12 adjacent to the second position, and to generate a current vicinity signal strength distribution map 1424, where M is an integer larger than 1.

Next, the smart multimedia transmission method 6 according to the invention also performs step S70 to transmit, by the second mobile data processing apparatus 52, the current vicinity signal strength distribution map 1424 to the server 14 through the network 4.

Finally, the smart multimedia transmission method 6 according to the invention also performs step S71 to compare, by the server 14, the current vicinity signal strength distribution map 1424 with the plurality of sampled vicinity signal strength distribution maps 1424 to determine a second selected beacon signal transmitting apparatus 12 from the M second candidate beacon signal transmitting apparatuses 12, to retrieve the multimedia data 1422 corresponding to the second selected beacon signal transmitting apparatus 12 from the server 14, and to transmit the retrieved multimedia data 1422 to the second mobile data processing apparatus 52 through the network 4. The second mobile data processing apparatus 52 plays back the received multimedia data 1422.

Referring to FIG. 6, FIG. 6 is a flowchart diagram illustrating the smart multimedia transmission method 8 according to the fourth preferred embodiment of the invention. The environment and architecture for implementing the smart multimedia transmission method 8 according to the invention are shown in FIG. 1 and FIG. 2.

As shown in FIG. 6, the smart multimedia transmission method 8 according to the invention, firstly, performs step S80 to execute, by a first mobile data processing apparatus 32, a first application program stored in the first mobile data processing apparatus 32 to download a plurality of multimedia data 1422 from a server 14 through a network 4, where each of the multimedia data 1422 corresponds to one of a plurality of beacon signal transmitting apparatuses 12.

A reception threshold is previously stored in the first application program. The plurality of beacon signal transmitting apparatuses 12 are installed in a specific area 2. The first mobile data processing apparatus 32 is carried to a first position in the specific area 2.

Next, the smart multimedia transmission method 8 according to the invention, firstly, performs step S81 to execute, by the first mobile data processing apparatus 32, the first application program, according to the reception threshold, to receive N first beacon signals sent by N first candidate beacon signal transmitting apparatuses 12 of the plurality of beacon signal transmitting apparatuses 12 adjacent to the first position, where N is a variable integer equal to or larger than 0.

Afterwards, the smart multimedia transmission method 8 according to the invention performs step S82 to judge if N is larger than 1.

If the judging result of step S82 is YES, the smart multimedia transmission method 8 according to the invention performs step S83 to repeatedly update, by the first mobile data processing apparatus 32, the reception threshold by adding a predetermined addition to the reception threshold, and receiving the N first beacon signals sent by the N first candidate beacon signal transmitting apparatuses 12 adjacent to the first position in accordance with the updated reception threshold until N is equal to 1, where finally, the first candidate beacon signal transmitting apparatus 12 is a first selected beacon signal transmitting apparatus 12.

After step S83, finally, the smart multimedia transmission method 8 according to the invention performs step S84 to retrieve, by the first mobile data processing apparatus 32, the multimedia data 1422 corresponding to the first selected beacon signal transmitting apparatus 12. The first mobile data processing apparatus 32 plays back the retrieved multimedia data 1422.

Further, if the judging result of step S82 is NO, the smart multimedia transmission method 8 according to the invention performs step S85 to judge if N is equal to 0.

If the judging result of step S85 is YES, the smart multimedia transmission method 8 according to the invention performs step S86 to repeatedly update, by the first mobile data processing apparatus 32, the reception threshold by subtracting a predetermined deduction from the reception threshold, and receiving the N first beacon signals sent by the N first candidate beacon signal transmitting apparatuses 12 adjacent to the first position in accordance with the updated reception threshold until N is equal to 1, where finally, the first candidate beacon signal transmitting apparatus 12 is the first selected beacon signal transmitting apparatus 12. After step S86, the smart multimedia transmission method 8 according to the invention performs step S84. If N is equal to 1, the smart multimedia transmission method 8 according to the invention performs step S84.

Further, the smart multimedia transmission method 8 according to the invention is to replace, by the first mobile data processing apparatus 32, the reception threshold previously stored in the first application program by the updated reception threshold when the first selected beacon signal transmitting apparatus 12 is determined.

Figure 7:
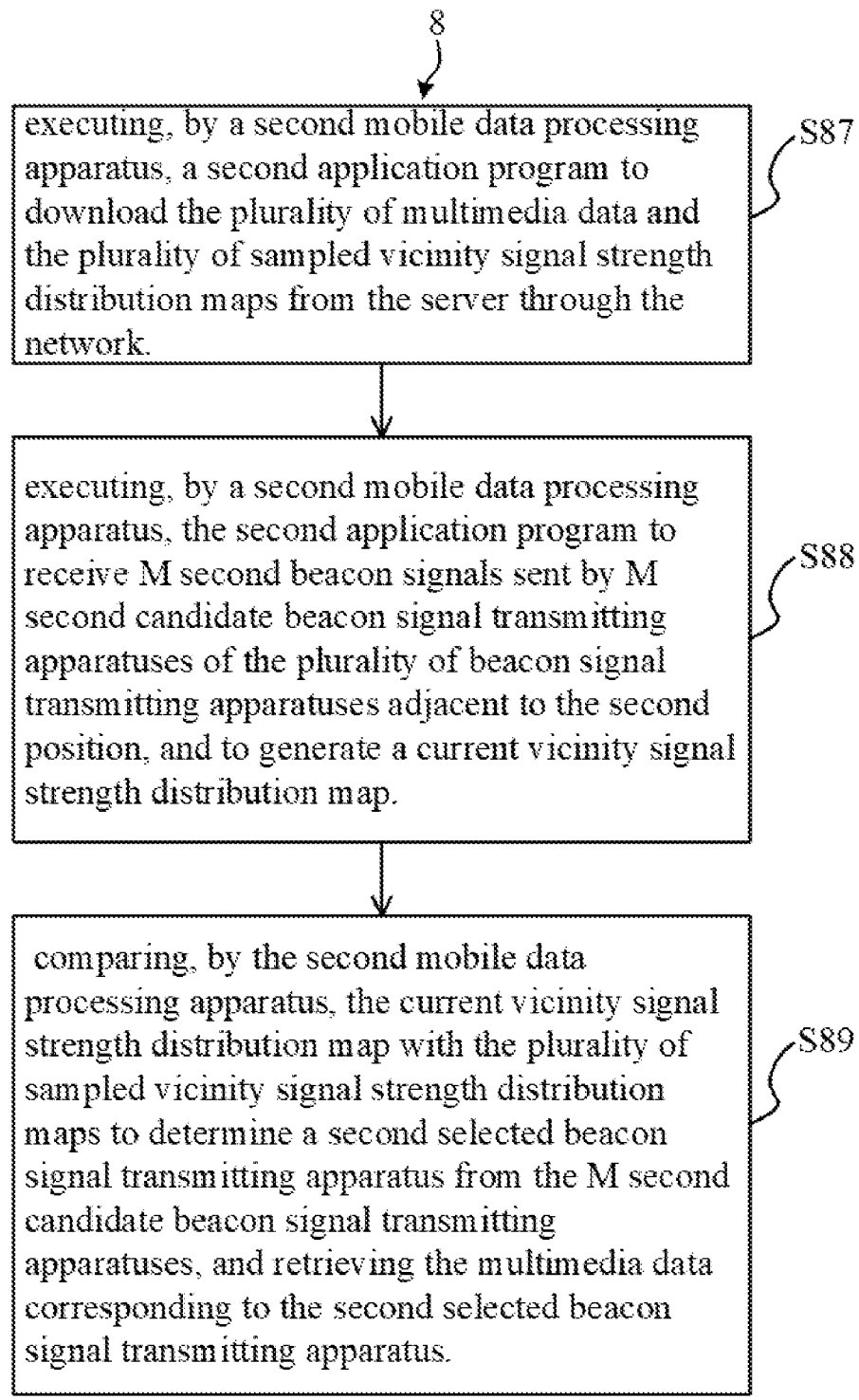
FIG. 7 is a flowchart diagram of further steps of the smart multimedia transmission method according to the fourth preferred embodiment of the invention.

Referring to FIG. 7, FIG. 7 is a flowchart diagram of further steps of the smart multimedia transmission method 8 according to the fourth preferred embodiment of the invention.

Further, the server 14 therein also stores a plurality of sampled vicinity signal strength distribution maps 1424 which each corresponds to one of the plurality of beacon signal transmitting apparatuses 12. As shown in FIG. 7, the smart multimedia transmission method 8 according to the invention also performs step S87 to execute, by a second mobile data processing apparatus 52, a second application program to download the plurality of multimedia data 1422 and the plurality of sampled vicinity signal strength distribution maps 1424 from the server 14 through the network 4, where the second mobile data processing apparatus 52 is carried to a second position in the specific area 2.

Then, the smart multimedia transmission method 8 according to the invention also performs step S88 to execute, by a second mobile data processing apparatus 52, the second application program to receive M second beacon signals sent by M second candidate beacon signal transmitting apparatuses 12 of the plurality of beacon signal transmitting apparatuses 12 adjacent to the second position, and to generate a current vicinity signal strength distribution map 1424, where M is an integer larger than 1.

Finally, the smart multimedia transmission method 8 according to the invention performs step S89 to compare, by the second mobile data processing apparatus 52, the current vicinity signal strength distribution map 1424 with the plurality of sampled vicinity signal strength distribution maps 1424 to determine a second selected beacon signal transmitting apparatus 12 from the M second candidate beacon signal transmitting apparatuses 12, and retrieving the multimedia data 1422 corresponding to the second selected beacon signal transmitting apparatus 12. The second mobile data processing apparatus 52 plays back the retrieved multimedia data 1422.

With the detailed description of the above preferred embodiments of the invention, it is clear to understand that the smart multimedia transmission system and method according to the invention enable a mobile data processing apparatus of a user to quickly determine a selected beacon signal transmitting apparatus, and then a server transmits the multimedia data corresponding to the selected beacon signal transmitting apparatus to the mobile data processing apparatus. Thereby, the smart multimedia transmission system and method according to the invention also make the user experience the location-based service in these specific areas extremely good.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A smart multimedia transmission system, comprising:
   a plurality of beacon signal transmitting apparatuses, installed in a specific area; and
   a server, comprising:
   a data storage unit, therein storing a plurality multimedia data which each corresponds to one of the plurality of beacon signal transmitting apparatuses;
   a communication unit; and
   at least one processor, respectively coupled to the data storage unit and the communication unit,
   wherein a first mobile data processing apparatus is capable of communicating with the server through a network, a first application program is stored in the first mobile data processing apparatus, a reception threshold is previously stored in the first application program, the first mobile data processing apparatus is carried to a first position in the specific area, and executes the first application program to transmit a first request information to the at least one processor, the at least one processor transmits the plurality of multimedia data stored in the data storage unit to the first mobile data processing apparatus in response to the first request information through the communication unit and the network, the first mobile data processing apparatus executes the first application program, according to the reception threshold, to receive N first beacon signals sent by N first candidate beacon signal transmitting apparatuses of the plurality of beacon signal transmitting apparatuses adjacent to the first position, N is a variable integer equal to or larger than 0, wherein if N is equal to 0, the first mobile data processing apparatus repeatedly updates the reception threshold by subtracting a predetermined deduction from the reception threshold and receives the N first beacon signals sent by the N first candidate beacon signal transmitting apparatuses adjacent to the first position in accordance with the updated reception threshold until N is equal to 1, finally, the first candidate beacon signal transmitting apparatus is a first selected beacon signal transmitting apparatus, wherein if N is larger than 1, the first mobile data processing apparatus repeatedly updates the reception threshold by adding a predetermined addition to the reception threshold and receives the N first beacon signals sent by the N first candidate beacon signal transmitting apparatuses adjacent to the first position in accordance with the updated reception threshold until N is equal to 1, finally, the first candidate beacon signal transmitting apparatus is the first selected beacon signal transmitting apparatus, and wherein the first mobile data processing apparatus retrieves the multimedia data corresponding to the first selected beacon signal transmitting apparatus.

2. The smart multimedia transmission system of claim 1, wherein the data storage unit stores a plurality of sampled vicinity signal strength distribution maps which each corresponds to one of the plurality of beacon signal transmitting apparatuses, wherein a second mobile data processing apparatus is capable of communicating with the server through the network, a second application program is stored in the second mobile data processing apparatus, the second mobile data processing apparatus is carried to a second position in the specific area, and executes the second application program to transmit a second request information to the at least one processor through the network and the communication unit, the at least one processor transmits the multimedia data and the sampled vicinity signal strength distribution maps stored in the data storage unit to the second mobile data processing apparatus in response to the second request information through the communication unit and the network, the second mobile data processing apparatus executes the second application program to receive M second beacon signals sent by M second candidate beacon signal transmitting apparatuses of the plurality of beacon signal transmitting apparatuses adjacent to the second position, and to generate a current vicinity signal strength distribution map, M is an integer larger than 1, and wherein the second mobile data processing apparatus compares the current vicinity signal strength distribution map with the plurality of sampled vicinity signal strength distribution maps to determine a second selected beacon signal transmitting apparatus from the M second candidate beacon signal transmitting apparatuses, and retrieves the multimedia data corresponding to the second selected beacon signal transmitting apparatus.

3. A smart multimedia transmission method, comprising:

by a first mobile data processing apparatus, executing a first application program stored in the first mobile data processing apparatus to download a plurality of multimedia data from a server through a network, wherein each of the multimedia data corresponds to one of a plurality of beacon signal transmitting apparatuses, a reception threshold is previously stored in the first application program, the plurality of beacon signal transmitting apparatuses are installed in a specific area, the first mobile data processing apparatus is carried to a first position in the specific area;

by the first mobile data processing apparatus, executing the first application program, according to the reception threshold, to receive N first beacon signals sent by N first candidate beacon signal transmitting apparatuses of the plurality of beacon signal transmitting apparatuses adjacent to the first position, wherein N is a variable integer equal to or larger than 0;

if N is larger than 1, by the first mobile data processing apparatus, repeatedly updating the reception threshold by adding a predetermined addition to the reception threshold, and receiving the N first beacon signals sent by the N first candidate beacon signal transmitting apparatuses adjacent to the first position in accordance with the updated reception threshold until N is equal to 1, wherein finally, the first candidate beacon signal transmitting apparatus is a first selected beacon signal transmitting apparatus;

if N is equal to 0, by the first mobile data processing apparatus, repeatedly updating the reception threshold by subtracting a predetermined deduction from the reception threshold, and receiving the N first beacon signals sent by the N first candidate beacon signal transmitting apparatuses adjacent to the first position in accordance with the updated reception threshold until N is equal to 1, wherein finally, the first candidate beacon signal transmitting apparatus is the first selected beacon signal transmitting apparatus; and by the first mobile data processing apparatus, retrieving the multimedia data corresponding to the first selected beacon signal transmitting apparatus.

4. The smart multimedia transmission method of claim 3, wherein the server therein also stores a plurality of sampled vicinity signal strength distribution maps which each corresponds to one of the plurality of beacon signal transmitting apparatuses, the smart multimedia transmission method further comprising:

by a second mobile data processing apparatus, executing a second application program to download the plurality of multimedia data and the plurality of sampled vicinity signal strength distribution maps from the server through the network, wherein the second mobile data processing apparatus is carried to a second position in the specific area;

by a second mobile data processing apparatus, executing the second application program to receive M second beacon signals sent by M second candidate beacon signal transmitting apparatuses of the plurality of beacon signal transmitting apparatuses adjacent to the second position, and to generate a current vicinity signal strength distribution map, wherein M is an integer larger than 1; and by the second mobile data processing apparatus, comparing the current vicinity signal strength distribution map with the plurality of sampled vicinity signal strength distribution maps to determine a second selected beacon signal transmitting apparatus from the M second candidate beacon signal transmitting apparatuses, and retrieving the multimedia data corresponding to the second selected beacon signal transmitting apparatus.

* * * * *